(12) United States Patent
Hashimoto et al.

(10) Patent No.: US 12,536,911 B2
(45) Date of Patent: Jan. 27, 2026

(54) INFORMATION PROCESSING DEVICE

(71) Applicant: TOYOTA JIDOSHA KABUSHIKI KAISHA, Toyota (JP)

(72) Inventors: Osami Hashimoto, Mishima (JP); Hiroki Tashima, Fujisawa (JP); Toshihiko Inoue, Nagoya (JP); Kazuma Toya, Anjyo (JP); Takashi Tazoe, Nagoya (JP); Ryota Bingo, Nisshin (JP); Kosuke Sakakibara, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 117 days.

(21) Appl. No.: 18/539,940

(22) Filed: Dec. 14, 2023

(65) Prior Publication Data
US 2024/0233544 A1    Jul. 11, 2024

(30) Foreign Application Priority Data

Jan. 10, 2023 (JP) .................. 2023-001996

(51) Int. Cl.
| | |
|---|---|
| *G08G 1/16* | (2006.01) |
| *G06V 10/82* | (2022.01) |
| *G06V 20/10* | (2022.01) |
| *G06V 20/13* | (2022.01) |
| *G08G 1/01* | (2006.01) |

(52) U.S. Cl.
CPC ............. *G08G 1/164* (2013.01); *G06V 10/82* (2022.01); *G06V 20/13* (2022.01); *G06V 20/182* (2022.01); *G08G 1/012* (2013.01); *G08G 1/166* (2013.01)

(58) Field of Classification Search
CPC ........ G08G 1/164; G08G 1/012; G08G 1/166; G06V 10/82; G06V 20/13; G06V 20/182; G01C 21/343; G01C 21/3492; G01C 21/3647; G01S 19/45
See application file for complete search history.

(56) References Cited

U.S. PATENT DOCUMENTS

| | | | |
|---|---|---|---|
| 2010/0235035 A1* | 9/2010 | Nishira | ..................... B60T 7/22 |
| | | | 701/31.4 |
| 2020/0284588 A1* | 9/2020 | Sundar | ................. G06V 20/586 |

FOREIGN PATENT DOCUMENTS

| | | |
|---|---|---|
| JP | H10-086761 A | 4/1998 |
| JP | 2008-203167 A | 9/2008 |
| JP | 2010-224970 A | 10/2010 |
| JP | 2022-186572 A | 12/2022 |

* cited by examiner

*Primary Examiner* — Alan D Hutchinson
(74) *Attorney, Agent, or Firm* — Dinsmore & Shohl LLP

(57) ABSTRACT

A information processing device includes: a processor, wherein the processor is configured to: acquire a satellite image of a scheduled travel path, among satellite images captured by an artificial satellite; detect, from the acquired satellite image, an obstruction that a host vehicle should avoid on the scheduled travel path; and calculate a road width for which passage of the host vehicle is possible on the scheduled travel path, in consideration of the detected obstruction.

7 Claims, 5 Drawing Sheets

INFORMATION PROCESSING DEVICE

CROSS-REFERENCE TO RELATED APPLICATION

This application is based on and claims priority under 35 USC 119 from Japanese Patent Application No. 2023-001996 filed on Jan. 10, 2023, the disclosure of which is incorporated by reference herein.

BACKGROUND

Technical Field

The present disclosure relates to an information processing device.

Related Art

Japanese Patent Application Laid-Open (JP-A) No. 2008-203167 discloses a navigation device that performs guidance based on a current position of a vehicle and a map database. Moreover, the navigation device of Japanese Patent Application Laid-Open (JP-A) No. 2008-203167 determines whether or not passage of the vehicle is difficult based on the vehicle width of the vehicle and the width of the road, and notifies the occupant of the determination result.

However, there is room for improvement in a configuration such as the navigation device described in Japanese Patent Application Laid-Open (JP-A) No. 2008-203167 that determines whether or not passage of a vehicle is possible based on road widths stored in a database, since there may be cases in which passage of the vehicle is not possible depending on actual road conditions.

SUMMARY

An object of the present disclosure is to provide an information processing device capable of accurately determining whether or not passage of a vehicle is possible.

An information processing device according to a first aspect includes: an image acquisition section that is configured to acquire a satellite image of a scheduled travel path, among satellite images captured by an artificial satellite; an obstruction detection section that is configured to detect, from the acquired satellite image, an obstruction that a host vehicle should avoid on the scheduled travel path; and a road width calculation section that is configured to calculate a road width for which passage of the host vehicle is possible on the scheduled travel path, in consideration of the detected obstruction.

In the information processing device according to the first aspect, the image acquisition section acquires a satellite image of a scheduled travel path of a host vehicle. Further, the obstruction detection section detects, from the acquired satellite image, an obstruction that the host vehicle should avoid on the scheduled travel path. Moreover, the road width calculation section calculates a road width for which passage of the host vehicle is possible on the scheduled travel path, in consideration of the detected obstruction. As described above, by calculating the road width for which passage of the host vehicle is possible by considering an obstruction that is actually present on the road on the scheduled travel path, it is possible to accurately determine whether or not passage of the host vehicle is possible, as compared to a case in which only the data of road widths stored in a database or the like is referred to. Note that "obstructions" as referred to herein are not limited to objects installed or placed on a road, and are concepts broadly encompassing vehicles during travel, plants that extend out to a road, and the like.

An information processing device according to a second aspect is the information processing device according to the first aspect, wherein the obstruction detection section is configured to detect at least an obstruction installed on a road and an oncoming vehicle that is traveling toward the host vehicle.

In the information processing device according to the second aspect, the obstruction detection section detects an obstruction installed on a road and an oncoming vehicle. This enables the road width for which passage of the host vehicle is possible to be calculated in consideration of an obstruction installed on the road and an oncoming vehicle.

An information processing device according to a third aspect is the information processing device according to the first aspect, further including: a notification section that is configured to provide a predetermined notification in a case in which a difference between the road width for which passage of the host vehicle is possible, which is calculated by the road width calculation section, and a vehicle width of the host vehicle, is less than or equal to a predetermined value.

In the information processing device according to the third aspect, a predetermined notification is provided by the notification section, enabling the user to understand the relationship between the vehicle width of the host vehicle and the road width for which passage of the host vehicle is possible.

An information processing device according to a fourth aspect is the information processing device according to the third aspect, wherein the notification section is configured to provide a notification of a stopping point that is suitable for the host vehicle and an oncoming vehicle to pass each other.

In the information processing device according to the fourth aspect, by a notification of a point that is suitable for the host vehicle and an oncoming vehicle to pass each other being provided, smooth passage of the host vehicle can be promoted, particularly during travel on a road with a narrow road width or the like.

An information processing device according to a fifth aspect is the information processing device according to the first aspect, wherein the obstruction detection section is configured to detect the obstruction by inputting image data of the satellite image into a learning model that has undergone machine learning so as to determine obstructions.

In the information processing device according to the fifth aspect, by detecting an obstruction using a learning model, an obstruction can be detected more accurately than in a case of comparing with information on obstructions which is stored in advance.

The information processing device according to the present disclosure is capable of accurately determining whether or not passage of a vehicle is possible.

BRIEF DESCRIPTION OF THE DRAWINGS

An exemplary embodiment of the present disclosure will be described in detail based on the following figures, wherein.

DETAILED DESCRIPTION

Explanation follows regarding an information processing system S including an information processing device 10 according to an exemplary embodiment, with reference to the drawings.

Figure 1:
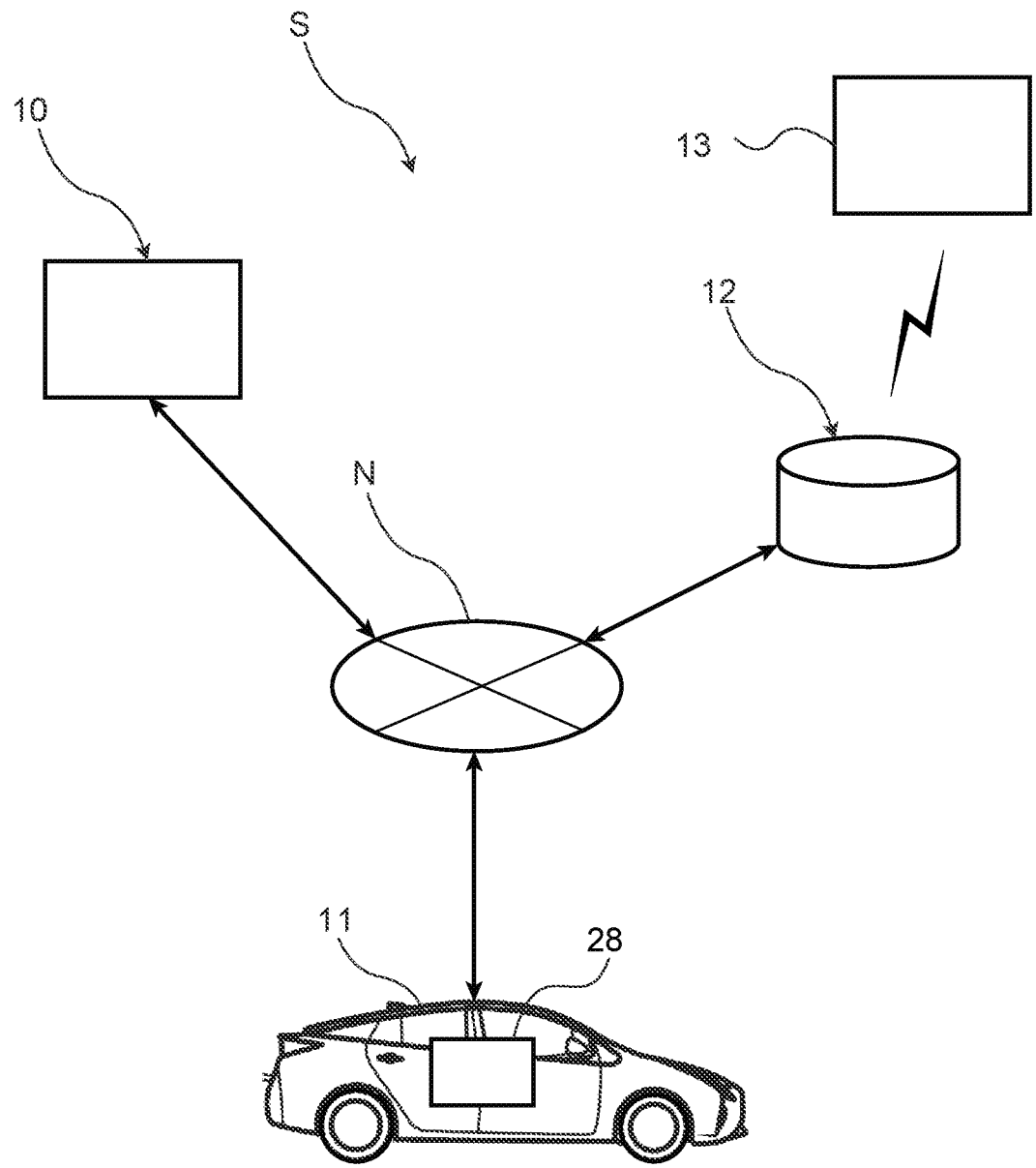
FIG. 1 is a schematic diagram illustrating an entire system including an information processing device according to an exemplary embodiment.

As illustrated in FIG. 1, an information processing system S according to the present exemplary embodiment includes an information processing device 10, a server 12, and a vehicle 11. The information processing device 10, the server 12, and the vehicle 11 are connected via a network N so as to be capable of communicating with each other.

The information processing device 10 is installed outside the vehicle 11, for example, and is configured to transmit requested information in response to an instruction received from the vehicle 11. Moreover, the information processing device 10 is configured so as to be able to acquire various information from the server 12 via the network N. Note that the information processing device 10 may be connected to plural vehicles 11 via the network N.

The vehicle 11 includes an onboard unit 28 serving as a vehicle control device. The onboard unit 28 of the present exemplary embodiment is, for example, an electronic control unit (ECU) that performs various control. The server 12 is installed outside the vehicle 11, and is configured so as to be capable of receiving data from an artificial satellite 13. Accordingly, the server 12 stores satellite images captured by an artificial satellite. Moreover, the server 12 stores information such as map information, dangerous locations, dangerous sections, and the like, and required information is transmitted to the onboard unit 28 via the network N in response to a request from the onboard unit 28 (the vehicle 11).

The information processing system S of the present exemplary embodiment is configured as described above, and the information processing device 10 is configured to acquire a satellite image of a scheduled travel path from among satellite images captured by the artificial satellite 13, and to calculate, from the satellite image, a road width for which passage of the vehicle 11 is possible on the scheduled travel path, taking into consideration obstructions that the vehicle 11 should avoid on the scheduled travel path.

Hardware Configuration of the Information Processing Device 10

Figure 2:
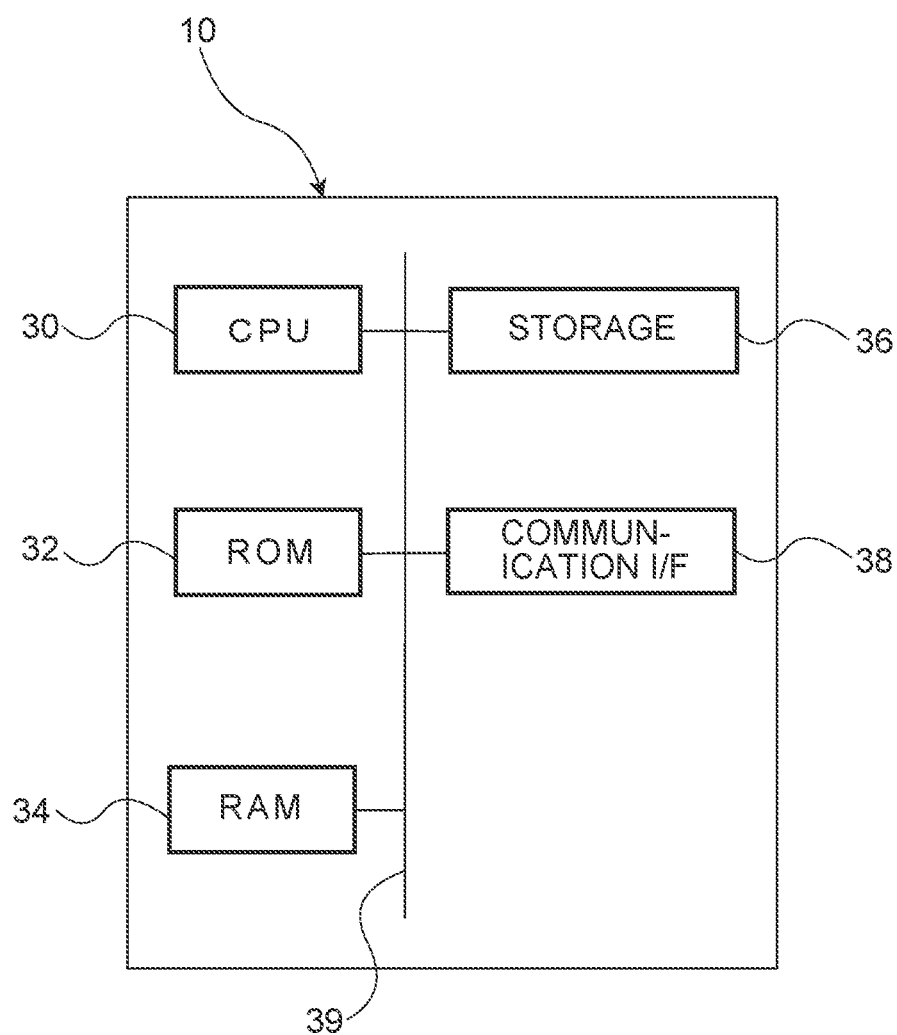
FIG. 2 is a block diagram illustrating a hardware configuration of an information processing device according to an exemplary embodiment.

As illustrated in FIG. 2, the information processing device 10 includes a central processing unit (CPU; serving as a processor) 30, read only memory (ROM) 32, random access memory (RAM) 34, storage 36, and a communication interface (communication I/F) 38. These respective configurations are communicably connected to each other via an internal bus 39.

The CPU 30 is a central processing unit that executes various programs and controls various components. Namely, the CPU 30 reads a program from the ROM 32 or the storage 36, and executes the program using the RAM 34 as a workspace. Further, the CPU 30 controls the respective configurations described above and performs a variety of computation processing in accordance with programs stored in the ROM 32 or the storage 36.

The ROM 32 stores various programs and various data. The RAM 34 serves as a workspace to temporarily store programs and data. The storage 36 is configured by a hard disk drive (HDD) or a solid state drive (SSD), and is a non-transitory storage medium that stores various programs including an operating system, as well as various data. In the present exemplary embodiment, a program or the like for performing various processing is stored in the ROM 32 or the storage 36.

The communication I/F 38 is an interface for the information processing device 10 to communicate with the server 12, the onboard unit 28, and other devices and, for example, a protocol such as a controller area network (CAN), Ethernet (registered trademark), long term evolution (LTE), a fiber distributed data interface (FDDI), or Wi-Fi (registered trademark) is used.

Hardware Configuration of the Onboard Unit 28

Figure 3:
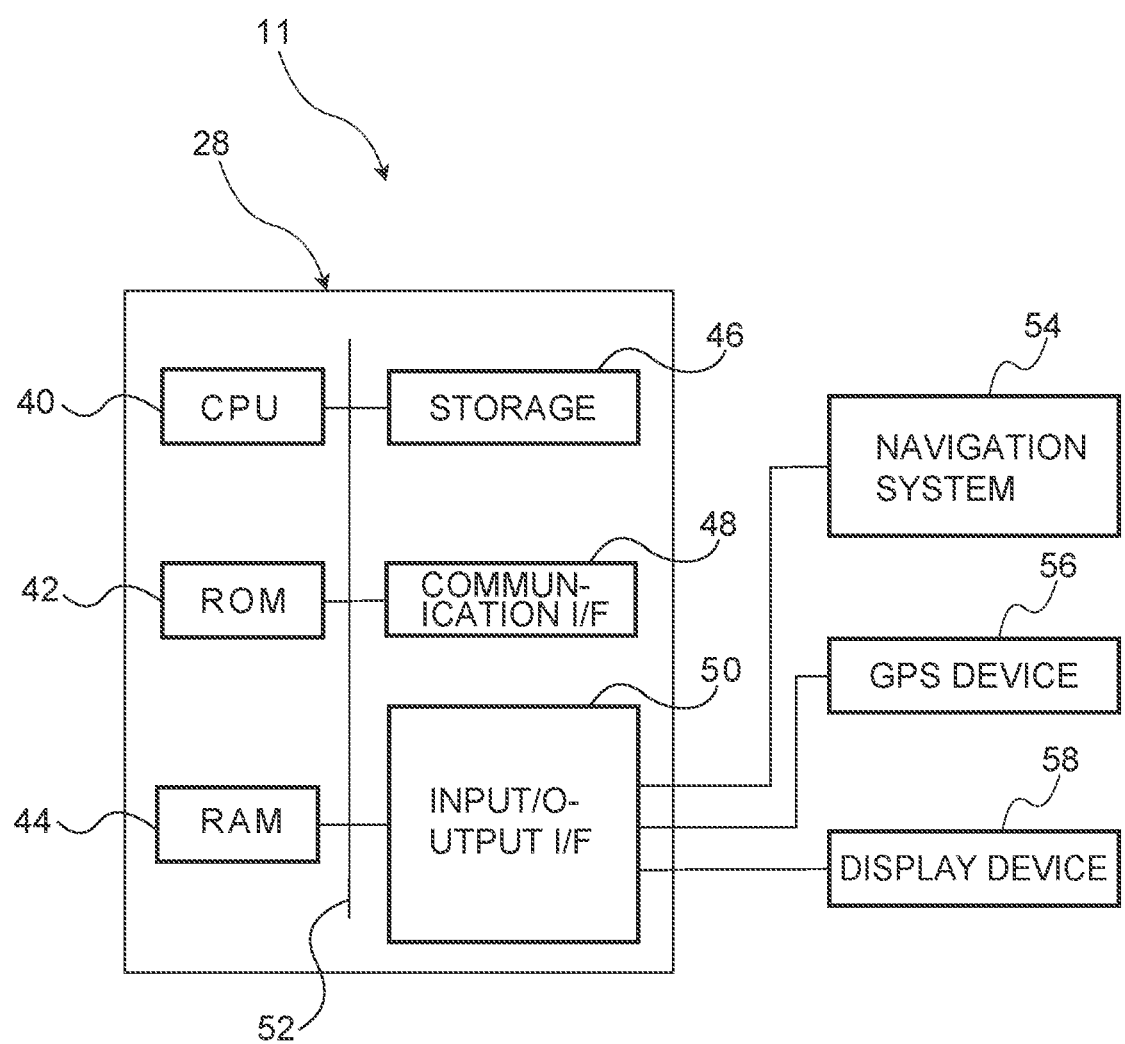
FIG. 3 is a block diagram illustrating a hardware configuration of an onboard unit in an exemplary embodiment.

As illustrated in FIG. 3, the onboard unit 28 includes a CPU 40, ROM 42, RAM 44, storage 46, a communication interface (communication I/F) 48, and an input/output interface (input/output I/F) 50. These respective configurations are communicably connected to each other via an internal bus 52.

The CPU 40 is a central processing unit that executes various programs and controls various components. Namely, the CPU 40 reads a program from the ROM 42 or the storage 46, and executes the program using the RAM 44 as a workspace. Further, the CPU 40 controls the respective configurations described above and performs a variety of computation processing in accordance with programs stored in the ROM 42 or the storage 46.

The ROM 42 stores various programs and various data. The RAM 44 serves as a workspace to temporarily store programs and data. The storage 46 is configured by an HDD or an SSD, and is a non-transitory storage medium that stores various programs including an operating system, as well as various data.

The communication I/F 48 is an interface for the onboard unit 28 to communicate with a server and other devices and, for example, a protocol such as a controller area network (CAN), Ethernet (registered trademark), long term evolution (LTE), a fiber distributed data interface (FDDI), or Wi-Fi (registered trademark) is used.

The input/output I/F 50 is connected to a navigation system 54, a global positioning system (GPS) device 56, and a display device 58. The navigation system 54 sets a scheduled travel path from a current location of the vehicle 11 to a destination, and performs various guidance so as to enable the vehicle 11 to travel along the scheduled travel path. At this time, the navigation system 54 acquires map information from the server 12 as appropriate. Further, in a case in which some or all of the map information is stored in the storage 46, the scheduled travel path may be set without obtaining map information from the server 12.

The GPS device 56 is a device that receives GPS signals from a GPS satellite to measure the current position of the vehicle 11. The display device 58 causes display of various information at a non-illustrated display provided inside the vehicle cabin. For example, the display device 58 causes display of information relating to the scheduled travel path set by the navigation system 54, information relating to roads for which passage of the vehicle 11 is not possible, and information relating to roads for which passage of the vehicle 11 is difficult.

Functional Configuration of the Information Processing Device 10

The information processing device 10 implements various functions using the above-described hardware resources. Explanation follows regarding functional configurations implemented by the information processing device 10, with reference to FIG. 4.

Figure 4:
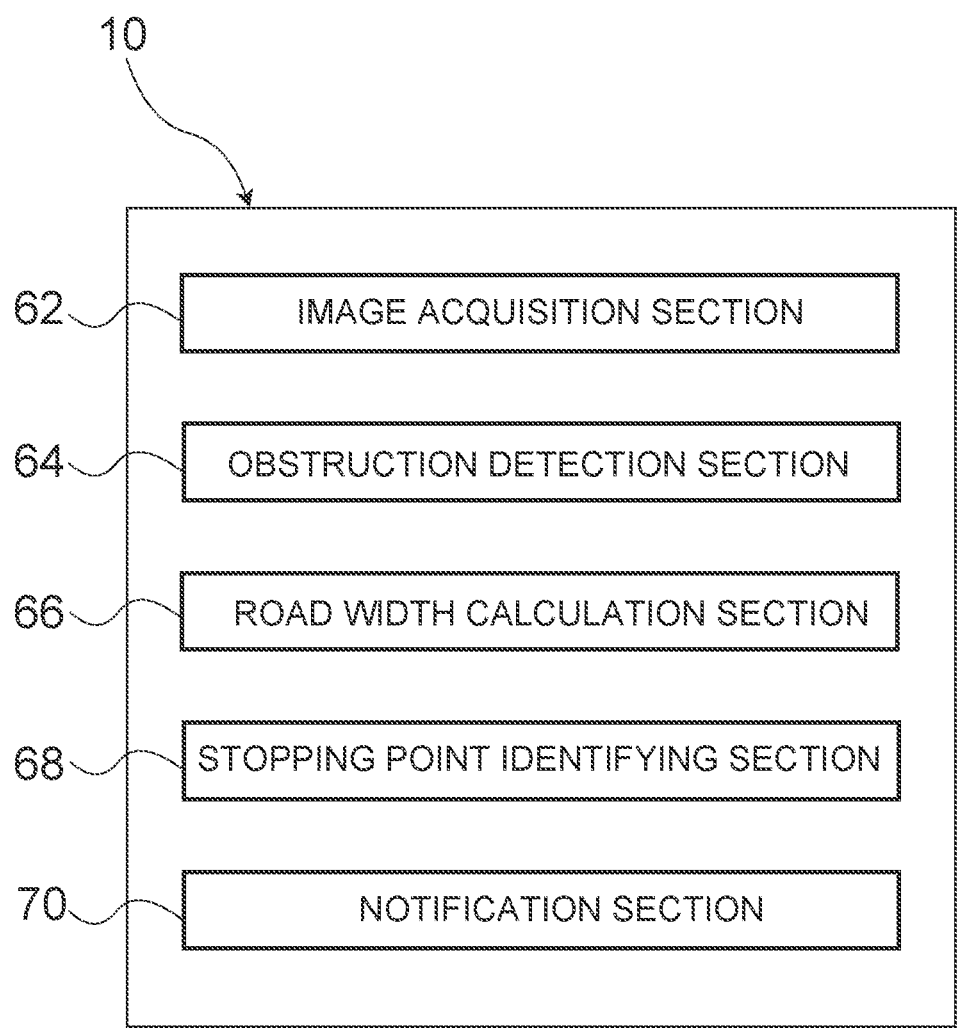
FIG. 4 is a block diagram illustrating a functional configuration of an information processing device according to an exemplary embodiment.

As illustrated in FIG. 4, the functional configuration of the information processing device 10 includes an image acquisition section 62, an obstruction detection section 64, a road width calculation section 66, a stopping point identifying section 68, and a notification section 70. Note that the respective functional configurations are implemented by the CPU 30 reading and executing a program stored in the ROM 32 or the storage 36.

The image acquisition section 62 acquires a satellite image of a scheduled travel path from among the satellite images captured by the artificial satellite 13. For example, in a case in which a satellite image captured by the artificial satellite 13 is stored in the server 12 for each captured location, the image acquisition section 62 acquires, from the server 12, a satellite image of a scheduled travel path of the vehicle 11.

Note that the image acquisition section 62 may acquire only satellite images of certain roads of the scheduled travel path of the vehicle 11. For example, in a case in which data relating to a road width of roads is stored in advance in the navigation system 54, the image acquisition section 62 may acquire only satellite images of roads for which the road width of the road is equal to or less than a predetermined value. Moreover, for example, the image acquisition section 62 may acquire only satellite images of roads on which there is no centerline because of the narrow width of the roads. In a case in which only satellite images of some roads are acquired, image processing such as detection of obstructions, which are described below, can be performed quickly even in a case in which the scheduled travel path extends over a long distance.

The obstruction detection section 64 detects, from the satellite image acquired by the image acquisition section 62, an obstruction that the vehicle 11 should avoid on the scheduled travel path. Note that the obstructions referred to herein broadly include utility poles installed on a road, garbage bags placed on a road, fallen trees, plants that protrude out to a road, vehicles that are parked on a road, and oncoming vehicles traveling toward the vehicle 11.

As an example, the obstruction detection section 64 of the present exemplary embodiment detects an obstruction by inputting image data of a satellite image into a learning model that has undergone machine learning so as to determine obstructions. For example, the learning model of the present exemplary embodiment is configured by a convolutional neural network (CNN) in which deep learning is performed using training data so as to determine whether or not each pixel in the satellite image represents an obstruction, and in a case in which an obstruction candidate is determined, determine the type of the obstruction.

Note that the obstruction detection section 64 of the present exemplary embodiment detects an obstruction using a satellite image captured immediately before the vehicle 11 travels on a relevant road. In a case in which the artificial satellite 13 is a stationary satellite, the same capturing location can be captured at an arbitrary timing. In a case in which the artificial satellite 13 is a low-Earth-orbiting satellite, since the frequency of capturing is based on an orbital period of the satellite, in a case in which the satellite image captured immediately before traveling along the road cannot be acquired, the latest satellite image is used to detect obstructions.

The road width calculation section 66 calculates a road width for which passage of the vehicle 11 is possible on the scheduled travel path, taking into consideration detected obstructions. More specifically, the road width of a road, excluding the portion with the obstruction, is calculated from the satellite image. For example, in a case in which an obstruction is a utility pole, a sign post, a fallen tree, a dropped object, or a plant, the road width is calculated with respect to the area excluding the area that cannot be travelled due to these obstructions. Further, in a case in which the obstruction is an oncoming vehicle, the vehicle width of the oncoming vehicle is calculated from the satellite image, and the road width is calculated by excluding this vehicle width.

Note that in the present exemplary embodiment, as an example, in a case in which both an obstruction that is stationary on a road and an oncoming vehicle are present, the road width of the vehicle 11 when the oncoming vehicle travels at the position of the obstruction may be calculated as the narrowest road width. Namely, a width in which the length of the obstruction and the vehicle width of the oncoming vehicle are subtracted from the road width in a state in which there is no obstruction, is the narrowest road width.

The stopping point identifying section 68 identifies a stopping point for the vehicle 11 in a case in which a predetermined condition has been satisfied. For example, the stopping point identifying section 68 may identify a stopping point in a case in which there is a road including an area in which it is not possible for the vehicle 11 and an ongoing vehicle to pass each other.

In a case in which the narrowest road width calculated by the road width calculation section 66 is narrower than the vehicle width of the vehicle 11 in a state in which an oncoming vehicle is present, the stopping point identifying section 68 of the present exemplary embodiment identifies, as a stopping point, a point having a road width at which it is possible for the vehicle 11 and the oncoming vehicle to pass each other prior to the obstruction. In particular, the stopping point identifying section 68 may identify a portion with a widest road width prior to the obstruction as a stopping point.

The notification section 70 provides a predetermined notification in a case in which the difference between the road width for which passage of the vehicle 11 is possible, which is calculated by the road width calculation section 66, and the vehicle width of the vehicle 11, is equal to or less than a predetermined value. More specifically, the notification section 70 provides a notification by causing display of information relating to the road width at a display provided inside the vehicle cabin using the display device 58.

For example, in a state in which the vehicle 11 is traveling on a road with a narrow road width, in a case in which the distance to an obstruction is equal to or less than a predetermined distance, the notification section 70 causes display, at the display inside the vehicle cabin, that an obstruction is present. At this time, the notification section 70 may also cause display of the type of obstruction or the like.

Alternatively, for example, the notification section 70 may cause display of an alternative route by selecting a road with a wide road width from the roads in the periphery of the scheduled travel path.

Moreover, the notification section 70 provides a notification of a stopping point that is suitable for the vehicle 11 and an oncoming vehicle to pass each other. More specifically, the notification section 70 provides a notification by causing display of information such as an oncoming vehicle traveling toward the vehicle 11 and the distance to a stopping point at which it is possible for the vehicle 11 and the oncoming vehicle to pass each other.

Operation

Next, explanation follows regarding operation of the present exemplary embodiment.

Figure 5:
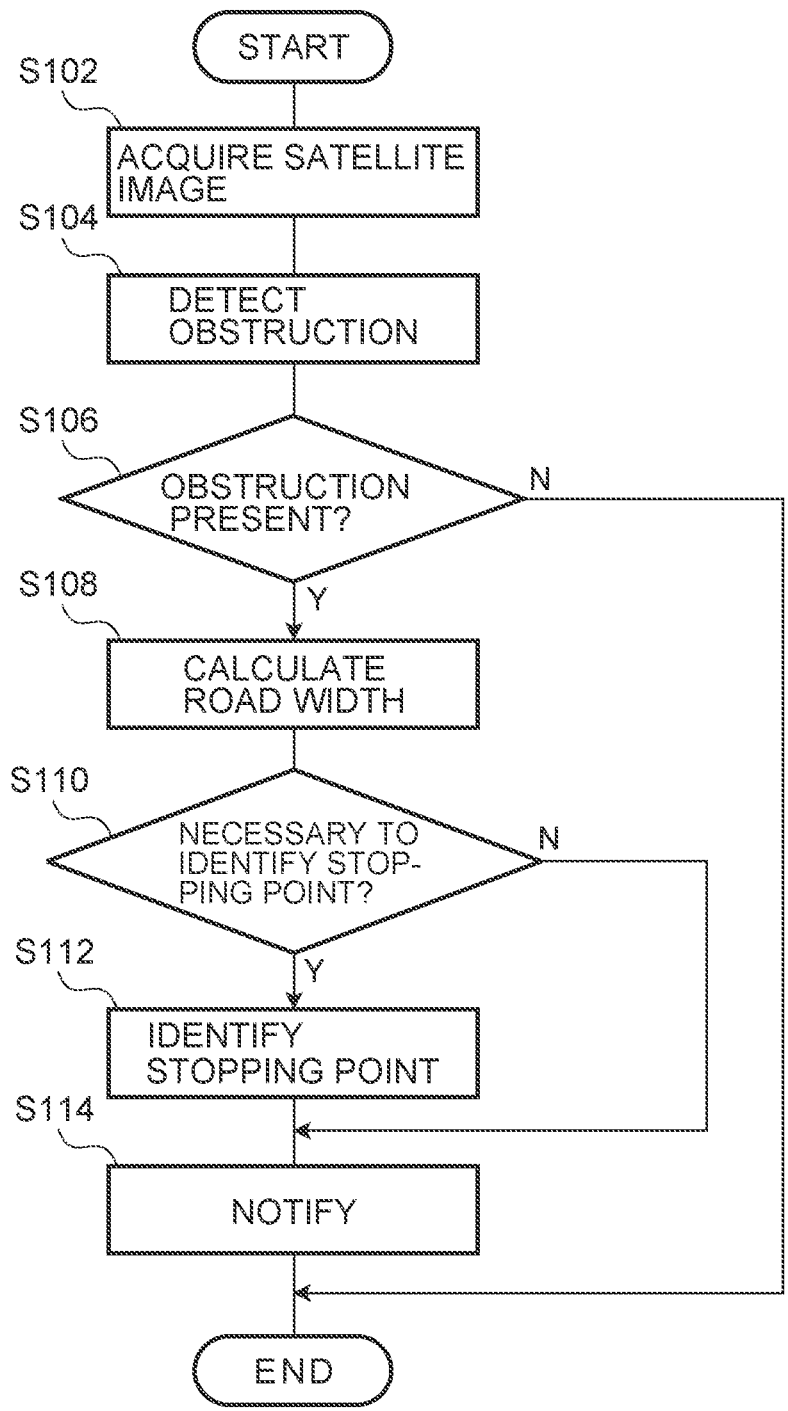
FIG. 5 is a flowchart illustrating an example of a flow of notification processing in an exemplary embodiment.

Explanation follows regarding an example of notification processing performed by the information processing device 10 of the present exemplary embodiment, with reference to the flowchart illustrated in FIG. 5. This display processing is executed by the CPU 30 reading a display program from the ROM 32 or the storage 36, and loading and executing the display program in the RAM 34. Note that in the present exemplary embodiment, as an example, the notification processing is executed after a scheduled travel path of the vehicle 11 has been set.

Example of Notification Processing

At step S102, the CPU 30 acquires a satellite image. More specifically, using the functionality of the image acquisition section 62, the CPU 30 acquires, from the server 12, a satellite image of a road that satisfies a condition on a scheduled travel path.

The CPU 30 detects an obstruction at step S104. More specifically, using the functionality of the obstruction detection section 64, the CPU 30 detects, from the satellite image acquired at step S102, an obstruction that the vehicle 11 should avoid on the scheduled travel path. At this time, the CPU 30 also identifies the type of the obstruction.

At step S106, the CPU 30 determines whether or not there is an obstruction. More specifically, in a case in which an obstruction has been detected at step S104, the CPU 30 determines that there is an obstruction, and transitions to the processing of step S108. In a case in which an obstruction is not detected at step S104, the CPU 30 determines that there is no obstruction, and ends the notification processing. Namely, in the present exemplary embodiment, in a case in which an obstruction is not present on the scheduled travel path, a notification is not provided to an occupant.

At step S108, the CPU 30 calculates the road width. More specifically, using the functionality of the road width calculation section 66, the CPU 30 calculates a road width for which passage of the vehicle 11 is possible on the scheduled travel path.

At step S110, the CPU 30 determines whether or not it is necessary to identify a stopping point. In a case in which there is an area in which the vehicle 11 and an ongoing vehicle cannot pass each other based on the road width detected by the road width calculation section 66, the CPU 30 determines that it is necessary to identify a stopping point, transitions to the processing of step S112, and identifies a stopping point. The stopping point is identified by the function of the stopping point identifying section 68 so as to identify a portion with the widest road width prior to an obstruction as the stopping point.

In a case in which the CPU 30 determines that it is not necessary to identify a stopping point at step S110, the CPU 30 transitions to the processing of step S114 without going through the processing of step S112. At step S114, the CPU 30 notifies the occupant. More specifically, using the functionality of the notification section 70, the CPU 30 uses the display device 58 to provide a notification by causing display of, at the display inside the vehicle cabin, information on the obstruction and information on the stopping point.

Note that the CPU 30 may provide a notification at step S114 in a case in which the vehicle 11 has approached an obstruction.

As described above, according to the information processing device 10 of the present exemplary embodiment, the image acquisition section 62 acquires a satellite image of the scheduled travel path of the vehicle 11. Moreover, the obstruction detection section 64 detects, from the acquired satellite image, an obstruction that the vehicle 11 should avoid on the scheduled travel path. Further, the road width calculation section 66 calculates a road width for which passage of the vehicle 11 is possible on the scheduled travel path, taking into consideration detected obstructions. In this manner, by calculating a road width for which passage of the vehicle 11 is possible on the scheduled travel path taking into consideration obstructions that are actually present on the road on the scheduled travel path, it is possible to accurately determine whether or not passage of the vehicle 11 is possible, as compared to a case in which only the data of road widths stored in a database or the like is referred to.

Moreover, in the present exemplary embodiment, the obstruction detection section 64 detects an obstruction installed on a road and an oncoming vehicle. This enables the road width for which passage of the vehicle 11 is possible to be calculated in consideration of an obstruction installed on a road and an oncoming vehicle.

Moreover, in the present exemplary embodiment, a predetermined notification is provided by the notification section 70, enabling the user to understand the relationship between the vehicle width of the vehicle 11 and the road with for which passage of the vehicle 11 is possible. In particular, by displaying information on obstructions, information on stopping points, and the like at a display inside the vehicle cabin using the display device 58, smooth passage of the vehicle can be promoted particularly during travel on a road with a narrow road width.

Moreover, in the present exemplary embodiment, since the obstruction detection section 64 detects an obstruction using the learning model, the obstruction detection section 64 is able to detect an obstruction more accurately than in a case of comparing with information on obstructions which is stored in advance.

Although explanation has been given regarding the information processing device 10 according to an exemplary embodiment, obviously various embodiments may be implemented within a range not departing from the gist of the present disclosure. Although a road width is calculated based on only an obstruction detected from a satellite image and a notification is provided to the occupant in the above-described exemplary embodiment, there is no limitation thereto, and the occupant may be notified as to whether or not passage of the vehicle 11 is possible by referring to other information. For example, vehicle information on vehicles that have previously traveled along a scheduled travel path may be aggregated from satellite images capturing the scheduled travel path, and this vehicle information may be referred to in order to notify an occupant of whether or not passage of the vehicle 11 is possible. In this case, in a case in which only vehicles smaller than the vehicle 11 are passing through the scheduled travel path, the notification section 70 may notify the occupant that passage of the vehicle 11 is difficult.

Further, in the above-described exemplary embodiment, although the notification processing is executed in a case in which a scheduled travel path of the vehicle 11 is set, there is no limitation thereto. For example, the notification processing may be executed in a case in which the scheduled travel path has not been set, or in a case in which the navigation system 54 and the GPS device 56 have confirmed that the vehicle 11 is traveling on a road with a narrow road width, or in a case in which the possibility of the vehicle 11 entering a road with a narrow road width is high.

Moreover, in the above-described exemplary embodiment, any of various types of processors other than the CPU 30 may execute the processing that the CPU 30 executes by reading a program. Examples of such processors include a Programmable Logic Device (PLD) in which the circuit configuration can be modified post-manufacture, such as a Field-Programmable Gate Array (FPGA), or a specialized electric circuit that is a processor with a specifically-designed circuit configuration for executing specific processing, such as an Application Specific Integrated Circuit (ASIC). Further, the above-described processing may be executed by one of these various types of processors, or may be executed by combining two or more of the same type or different types of processors, for example, the above-described processing may be executed by plural FPGAs, or a combination of a CPU and an FPGA, or the like. Moreover, a hardware configuration of the various processors is specifically formed as an electric circuit combining circuit elements such as semiconductor elements.

In addition, although various data is stored in the storage 36 in the above-described exemplary embodiment, there is no limitation thereto. For example, a non-transitory storage medium such as a compact disc (CD), a digital versatile disc (DVD), or universal serial bus (USB) memory may act as a storage section. In this case, various programs, data, and the like are stored in these storage media.

Moreover, the flow of processing described in the above-described exemplary embodiment is an example, and unnecessary steps may be deleted, new steps may be added, or the processing order may be rearranged within a range not departing from the spirit of the present disclosure.

What is claimed is:

1. An information processing device comprising:
    a processor, wherein the processor is configured to:
    acquire a satellite image of a scheduled travel path, among satellite images captured by an artificial satellite;
    detect, from the acquired satellite image, an obstruction that a host vehicle should avoid on the scheduled travel path;
    calculate a road width for which passage of the host vehicle is possible on the scheduled travel path, in consideration of the detected obstruction;
    cause display of an alternative route by selecting a road with the road width from a plurality of roads in a periphery of the scheduled travel path;
    execute notification processing in response to confirming via a navigation system and a GPS device that the host vehicle is traveling on the road with a narrow road width or a possibility of the vehicle entering the road with the narrow road width;
    provide a predetermined notification in a case in which a difference between the calculated road width for which passage of the host vehicle is possible, and a vehicle width of the host vehicle, is less than or equal to a predetermined value; and
    provide a second notification of a stopping point that is suitable for the host vehicle and an oncoming vehicle to pass each other.

2. The information processing device according to claim 1, wherein the processor is further configured to detect at least the obstruction installed on the road and the oncoming vehicle that is traveling toward the host vehicle.

3. The information processing device according to claim 1, wherein the processor is further configured to detect the obstruction by inputting image data of the satellite image into a learning model that has undergone machine learning so as to determine the obstruction as one of a plurality of obstructions.

4. The information processing apparatus according to claim 3, wherein the processor is further configured to perform deep learning to determine a type of the obstruction using training data to determine whether each pixel represents the obstruction.

5. An information processing device comprising:
    a processor, wherein the processor is configured to:
    acquire only a satellite image of a road on a scheduled travel path and having a road width that is less than or equal to a predetermined value, among satellite images captured by an artificial satellite;
    detect, from the acquired satellite image, an obstruction that a host vehicle should avoid on the scheduled travel path;
    calculate the road width for which passage of the host vehicle is possible on the scheduled travel path, in consideration of the detected obstruction;
    cause display of an alternative route by selecting a road with the road width from a plurality of roads in a periphery of the scheduled travel path; and
    execute notification processing in response to confirming via a navigation system and a GPS device that the host vehicle is traveling on the road with a narrow road width or a possibility of the vehicle entering the road with the narrow road width.

6. The information processing apparatus according to claim 5, wherein the processor is configured to acquire the satellite images of roads for which the road width is equal to or less than the predetermined value or for which the roads lack a centerline.

7. An information processing device comprising:
    a processor, wherein the processor is configured to:
    acquire a satellite image of a scheduled travel path, among satellite images captured by an artificial satellite;
    detect, from the acquired satellite image, an obstruction that a host vehicle should avoid on the scheduled travel path;
    calculate the road width for which passage of the host vehicle is possible on the scheduled travel path, in consideration of the detected obstruction;
    cause display of an alternative route by selecting a road with the road width from a plurality of roads in a periphery of the scheduled travel path;
    execute notification processing in response to confirming via a navigation system and a GPS device that the host vehicle is traveling on the road with a narrow road width or a possibility of the vehicle entering the road with the narrow road width;
    provide a predetermined notification in a case in which a difference between the calculated road width for which passage of the host vehicle is possible, and a vehicle width of the host vehicle, is less than or equal to a predetermined value; and
    provide a second notification of a stopping point that is suitable for the host vehicle and an oncoming vehicle to pass each other, wherein, in a case in which the calculated narrowest road width is narrower than the vehicle width of the host vehicle in a state in which the oncoming vehicle is present, the processor is configured to provide the second notification of, as the stopping point, a point having the road width at which it is possible for the host vehicle and the oncoming vehicle to pass each other prior to the obstruction.

* * * * *